Figure 1:
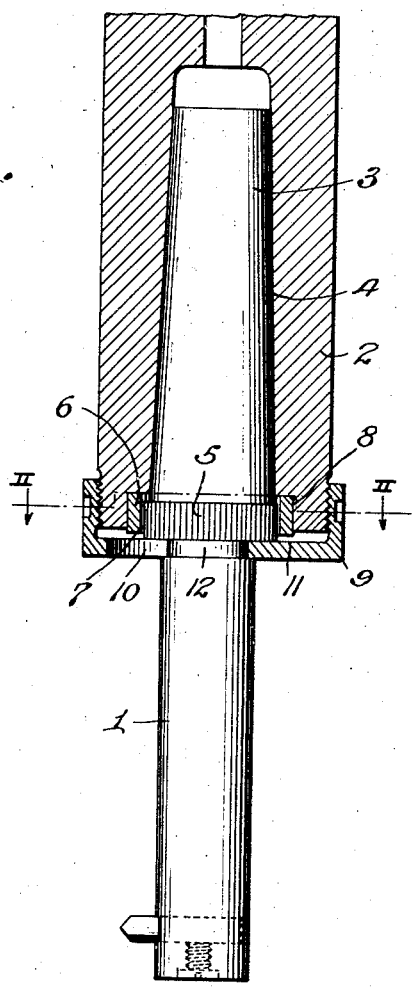

Nov. 17, 1942.    KARL-HEINZ STEFFENS    2,301,981
DRILL
Filed July 29, 1940

Inventor:
Karl-Heinz Steffens.
By
Richards & Geier
Attys.

Patented Nov. 17, 1942

2,301,981

UNITED STATES PATENT OFFICE 2,301,981

DRILL

Karl-Heinz Steffens, Dessau-in-Anhalt, Germany; vested in the Alien Property Custodian Application July 29, 1940, Serial No. 348,121
In Germany July 28, 1939

3 Claims. (Cl. 77—71)

(Granted under the provisions of sec. 14, act of
March 2, 1927; 357 O. G. 5)

This invention relates to a drill and refers more particularly to a bore tool holder of bore machines used for precision work.

In precision work bore machines, it is of great importance that the entire conical surface of the spindle be in contact with the corresponding surface of the mandrel in order that the rotary movement of the spindle be transmitted to the bore head over the entire contacting surfaces. Only then is it possible to eliminate the detrimental effects of incorrect fitting and to carry out the boring economically and with precision.

In prior art, the conical mandrel of the bore head was merely driven into the conical bore of the spindle and connected therewith by projections situated either at the upper end or the lower end of the mandrel. It is not possible in such constructions to fit the mandrel exactly into the spindle and to provide a perfect fit by the mutual grinding of these two parts if they were at all faulty in manufacture. The mandrel cannot be made to fit properly after long usage during which it was often removed and reinserted.

An object of the present invention is to so connect a drill mandrel with a drill spindle that no shifting of the mandrel in relation to the spindle will occur and that the axes of these two will coincide exactly while a firm and steady connection is attained.

Another object is to construct the drill spindle and the drill mandrel in such manner that the mandrel can be polished off in relation to the spindle bore to provide a perfect fit, that the operative axis of the mandrel will coincide exactly with the central axis of the spindle, and that the entire operative surface of the mandrel will be in contact with the entire supporting surface of the spindle bore, thereby fulfilling the requirements for perfect and precise drilling.

A further object is the provision of a drill which is particularly suitable for precision work and by means of which exact and economical drilling may be attained.

Other objects of the present invention will become apparent in the course of the following specification.

In accomplishing the objects of the present invention, it was found advisable to provide a special transmission element between the drill mandrel and the drill spindle, which is so formed that it firmly engages the correspondingly shaped walls of the spindle and mandrel. The transmission element is preferably polygonal in cross-section and may have the form of a square with rounded edges which fits into a correspondingly shaped cavity provided in the spindle. The mandrel is provided with projections which transmit the movement to the mandrel from the spindle and which fit into corresponding recesses formed in the transmission element. For instance, the mandrel and the transmission element may be provided with notched teeth. The spindle which receives the mandrel, carries a cover or closure which is screwed upon the spindle and, which is provided with an eccentrically located opening. This cover presses the conical portion of the mandrel firmly into the conical cavity of the spindle. The part of the cover which surrounds the eccentrically located opening has the form of a crescent which projects into a constricted part of the mandrel. By means of this arrangement, the mandrel is firmly held in the conical bore of the spindle and is prevented from falling out of the spindle.

The invention will appear more clearly from the following detailed description when taken in connection with the accompanying drawing, showing by way of example, a preferred embodiment of the inventive idea.

Figure 2:
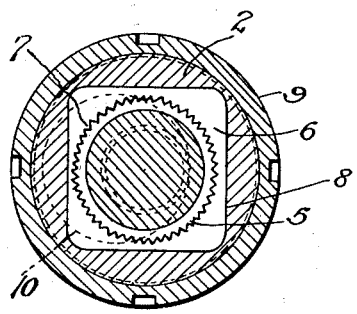

In the drawing:

Figure 1 shows a spindle and its closure in longitudinal section, the mandrel being shown in side elevation; and Figure 2 is a section along the line II—II of Figure 1.

The drill shown in the drawing includes a drill mandrel 1, the lower end of which serves as a tool holder. This lower end of the mandrel 1 is provided with a transverse bore into which the drill point or the drill steel is fitted.

The mandrel 1 has a frusto-conical upper portion 3 which fits into a conical cavity 4 provided in the drill spindle 2. The mandrel 1 also includes a cylindrical portion which is provided with notched teeth 5 and which is situated adjacent to the lower end of the conical portion 3.

A transmission element 6 which is shown in section in Figure 1, has inner surfaces which are provided with notched teeth 7 meshing with the teeth 5 of the mandrel 1.

Due to the provision of interengaging teeth 5 and 7, a firm connection which is devoid of play, is provided between the driving element, namely, the member 6 and the driven element, namely, the mandrel.

The transmission element 6 has, preferably, the form of a square having rounded edges and fitting into a correspondingly shaped bore 8 provided close to the lower end of the spindle 2.

Due to this arrangement, the transmission element 6 is firmly fitted in the spindle 2, so that it cannot rotate relatively thereto. However, the transmission element 6 can be conveniently removed whenever necessary, and replaced by another one. Thus a permanent connection is established between the spindle 2 and the transmission element 6.

A cover or closure 9 has a skirt provided with inner screw threads which mesh with outer screw threads upon the lower end of the spindle 2. The cover 9 which is screwed upon the spindle 2, is provided with an opening 10 which is eccentrically located in relation to the central axis of the cover 9. The outer surfaces of the skirt of the cover 9 are provided with recesses which facilitate the insertion of a key used to unscrew the cap 9 or to screw it upon the spindle 2.

The cover 9 has a portion 11 which surrounds the opening 10 and which is located at a short distance from the central axis of the cover 9.

The mandrel 1 has a narrower or constricted portion 12 which is situated between the teeth 5 and the lower cylindrical portion of the mandrel. The portion 11 of the cover projects in the form of a crescent into the space enclosed by the constricted portion 12 of the mandrel 1, and remain in this space irrespective of the position which the cover 9 may assume.

When the cover 9 is screwed upon the spindle 2, the inner surfaces of this portion 11 of the cover press against the lower cylindrical surface of that part of the mandrel which is provided with the teeth 5. Thus, the conical end 3 of the mandrel is held firmly in the bore hole of the spindle 2 and the mandrel is prevented from falling out of the spindle.

After the conical portion 3 has been fitted into the conical bore 4 the mandrel 1 is withdrawn from the spindle 2 and then the transmission element 6 is placed into the bore 8 of the spindle 2. The conical portion 3 of the mandrel 1 is introduced into the conical bore 4 of the spindle 2 and the teeth 5 of the mandrel are caused to engage the teeth 7 of the transmission element 6. Then the cover 9 is screwed upon the spindle 2. The mandrel 1 extends through the opening 10 of the cover 11 and the edges of the portion 11 of the cover 9 are brought into the space enclosed by the constricted part 12 of the mandrel, so that these edges engage the lower surface of that part of the spindle which carries the teeth 5. Thus, a part of the portion 11 of the cover 9 enclosing the opening 10, is in engagement with the constricted portion 12 of the mandrel. The cap 9 is screwed on until the conical portion 3 of the mandrel 1 fits tightly in the bore hole 4 and until the teeth 5 and 7 are completely in engagement with each other.

If the mandrel 1 is to be removed from the spindle 2, it is necessary first to unscrew the cover 9 and to withdraw it from the spindle 2. In the course of this unscrewing, the outer surface of the portion 11 of the cover 9 presses against the upper surface of the cylindrical end of the mandrel, just below the restricted part 12 of the mandrel 1. Thus, the mandrel 1 is withdrawn from the spindle 2 along with the cap 9.

The described construction affords the possibility of polishing off the mandrel portion 3 and the bore 4 of the spindle 2 by relative rotation, and thereby centering the mandrel 1 in respect to the spindle 2. The transmission element 6 which is firmly connected with the mandrel 1 and the spindle 2 serves the purpose of causing the mandrel 1 to rotate along with the spindle 2 and provides a good transmission of the driving forces. Thus, the co-axial adjustment of the mandrel 1 in the spindle and its rotation are carried out by two different means which do not influence each other, the adjustment being carried out by means of the conical member 3, while the rotation of the mandrel is caused by the transmission element 6.

The construction has the further advantage of the possibility of shifting the closure 9 over the mandrel 1 from the bottom up in the course of assembling to place it below the power-transmitting teeth 5 and 7. This is of particular advantage when the other end of the mandrel 1 is inaccessible on account of the provision of various parts of the bore head. The firm engagement of the conical mandrel portion 3 with the bore 4 is attained after the insertion of the transmission element 6, by screwing on the cover 9.

It is apparent that the specific illustration shown above has been given by way of illustration and not by way of limitation, and that the structure above described is subject to wide variation and modification, without departing from the scope or intent of the invention. All of such variations and modifications are to be included within the scope of the present invention.

I claim:

1. In a drill, a drill spindle, a drill mandrel having a portion fitting into a cavity formed in said drill spindle, and a transmission element having the form of a polygon in cross-section and fitting into another cavity of corresponding form which is formed in said drill spindle, said transmission element being hollow and enclosing said drill mandrel, said transmission element and said drill mandrel having interengaging teeth, and a cover mounted upon said drill spindle to press said portion of the drill mandrel into said cavity of the drill spindle.

2. In a drill, a drill spindle, a drill mandrel having a conical portion fitting into a conical cavity formed in said drill spindle, a transmission element having the form of a polygon in cross-section and fitting into another cavity of corresponding form which is formed in said drill spindle, said transmission element being in locking engagement with said drill mandrel, and a cover screwed upon said drill spindle to press the conical portion of said mandrel into the conical cavity of the spindle, said cover having an eccentrically located opening formed therein.

3. In a drill, a drill spindle, a drill mandrel having a conical portion fitting into a conical cavity formed in said drill spindle, a transmission element having the form of a polygon in cross-section and fitting into another cavity of corresponding form which is formed in said drill spindle, said transmission element being in locking engagement with said drill mandrel, and a cover screwed upon said drill spindle to press the conical portion of said mandrel into the conical cavity of the spindle, said cover having an eccentrically located opening formed therein, said mandrel having a comparatively narrow portion situated within said opening, said cover having a crescent-shaped portion located adjacent to said opening and engaging the narrow portion of the mandrel to prevent the mandrel from falling out of the spindle.

KARL-HEINZ STEFFENS.